United States Patent [19]
Fassell et al.

[11] 3,870,631
[45] Mar. 11, 1975

[54] APPARATUS AND METHOD FOR WET OXIDATION OF ORGANIC MATTER

[75] Inventors: W. Martin Fassell, Newport Beach; Donald W. Bridges, Irvine, both of Calif.

[73] Assignee: Barber-Colman Company, Rockford, Ill.

[22] Filed: Sept. 24, 1973

[21] Appl. No.: 400,123

Related U.S. Application Data

[63] Continuation-in-part of Ser. No. 346,152, March 29, 1973.

[52] U.S. Cl. .................... 210/63, 210/71, 210/181, 210/219, 210/220
[51] Int. Cl. ........................... C02b 3/08, C02c 5/04
[58] Field of Search ......... 162/31; 209/182; 210/10, 210/63, 67, 71, 179, 181, 219, 220, 221, 319, 320; 261/93

[56] References Cited
UNITED STATES PATENTS

| | | | |
|---|---|---|---|
| 3,547,813 | 12/1970 | Robinson et al. | 261/93 X |
| 3,549,529 | 12/1970 | Wiseman | 210/63 |
| 3,649,534 | 3/1972 | Schotte | 210/63 |
| 3,655,343 | 4/1972 | Galeano | 210/63 X |
| 3,761,409 | 9/1973 | McCoy et al. | 210/63 |

OTHER PUBLICATIONS

The Wetox Wet Oxidation Process & Mobile Pilot Plant, Barber-Colman Co., 3/15/72.

Proposed Process for the Treatment of Organic Waste Material Using a High-pressure Wet-oxidation Process, Philco-Ford, 10/27/70.

Technical Note, Summary of the technology of wet oxidation, Barber-Colman Co., 4/3/72.

Primary Examiner—Charles N. Hart
Assistant Examiner—Robert H. Spitzer

[57] ABSTRACT

The wet oxidation of combustible organic matter dissolved or suspended in aqueous medium in which the wet oxidation is carried out at elevated temperature and pressure, in the presence of oxygen containing gas introduced into the liquid at a state of high agitation, for the promotion of reactive sites and utilization of free radicals favorably to effect oxidation reaction conditions.

7 Claims, 3 Drawing Figures

APPARATUS AND METHOD FOR WET OXIDATION OF ORGANIC MATTER

This is a continuation-in-part of our copending application Ser. No. 346,152, filed Mar. 29, 1973, and entitled "Wet Oxidation Process."

This invention relates to the oxidation in aqueous medium of organic waste, hereinafter referred to as wet oxidation.

Wet oxidation is a form of combustion in which organic waste or other matter is burned while it is dissolved or suspended in a liquid, which for practical purposes usually is water. Wet oxidation can be carried out at practical rates only at elevated temperatures, considerably above the normal boiling point temperature of water, and therefore also at a pressure far above atmospheric. For this purpose, the slurry or solution of combustible organic material is confined within a reactor capable of maintaining the materials while under the desired temperature and pressure for achieving the desired rate of oxidation.

Wet oxidation is a safe, efficient, and economical way of destroying watery waste, such as slimes, sludges, and other organic waste, without the need of performing costly evaporation or dewatering, as would be required before the waste could be burned by present incineration techniques. For example, before sewage can be destroyed by incineration, the water content of the sewage slude (settled or filtered waste), normally in excess of 90% water, must be materially reduced. Thus much of the energy required for destruction by incineration is consumed merely for the removal of water, and a great part of the space, labor and equipment is employed for handling the materials for water removal.

Wet oxidation is also well adapted for use in the disposal of toxic and hazardous organic material, such as organic plastics, explosives, and the like combustible organic substances, without the danger of air pollution or explosion since the oxidative combustion can be controlled and because it is carried out under water.

The amount of combustible organic matter in suspension or solution in the aqueous medium is defined generally by reference to the amount of oxygen theoretically required for 100% combustion, identified as COD (chemical oxygen demand). The term BOD is similarly employed to define the biological oxygen demand for consumption of organic matter by biological means. Removal or destruction of organic matter chemically or biologically is measured by percent reduction in COD or BOD, respectively. For example, a 20% reduction in COD has reference to removal of contained organic matter in amount to reduce the COD by 20%. A 75% reduction in COD has reference to removal of chemically oxidizable organic matter by an amount to reduce the oxygen demand by 75%. A 100% reduction in COD would refer to substantially complete removal of oxidizable organic matter from solution or suspension.

Wet oxidation is a chemical oxidation process wherein combustion proceeds at various rates depending generally upon the concentration of combustible substances in the aqueous solution or suspension, the circulation of oxygen in the system, and the size of the organic molecules. It depends more particularly upon the temperature and pressure at which the wet oxidation reaction is carried out. By way of generalization, organic macro molecules react more readily than molecules of lower molecular weight, with greatest difficulty being experienced with the lower forms of organic oxidation products, such as in the form of acetic acid. As a result, combustion proceeds more rapidly initially as the macro molecules, present in dominant proportion in the original liquor, are subjected to oxidation and to cleavage into smaller molecular weight fragments which rapidly accumulate in the partially oxidized aqueous medium, as oxidation proceeds. Thus, the rate of wet oxidation slackens as the concentration of smaller organic molecules increases in the solution or suspension in the aqueous media.

Of perhaps greater significance is the temperature at which the oxidation reaction is carried out. In the past, substantially total destruction by wet oxidation has been achieved only at very high temperatures of about 550°F and at correspondingly high pressures of between 1,500-2,000 psi. This has limited large scale commercial practice of the wet oxidation process for common sewage sludge disposal because of the demand for equipment and materials that can withstand such reaction conditions and the corrosive character of the materials processed therethrough.

The wet oxidation process, for sewage and sludge disposal, is employed on a commercial scale in the "Zimpro" process which follows the teachings of the Zimmermann U.S. Pat. Nos. 2,665,249, 2,824,058, and 2,903,425.

The "Zimpro" process is essentially a batch process which makes use of a reactor in the form of a tower filled with the watery waste, usually containing the organic matter in an amount within the range of 3-5% by weight, and oxygen in an amount within the range of 1-2% by weight, usually in the form of air.

The reactants are pumped into the reaction tower in an amount to fill the tower and they are maintained therein for a set period of time under elevated temperature and pressure.

For the destruction of organic waste, the reactor is operated at a temperature usually within the range of 500°-550°F and at a pressure usually within the range of 1,500-2,000 psi. Maintenance of these extremely high temperatures and pressures is costly and because of the corrosiveness of the materials, under the operating conditions, maintenance is expensive and the operating life of the equipment is relatively short.

Modification of the "Zimpro" process for operation at lower temperatures and pressures has resulted in a relatively inefficient process which essentially dewaters the sewage sludge and is capable of use to decrease COD to a maximum of about 70%. The solid residue contains substantially less biodegradable organic matter and is sterile, but the remaining liquor is still strongly oxygen demanding and disposition is difficult.

It is an object of this invention to provide a method and means wherein the wet oxidation process can be carried out at lower temperature and lower pressure, yet at a rate of oxidation which is commercially acceptable, and which is capable of reducing COD by amounts up to 80-90%, thereby to provide a more efficient and more economical process for the disposal of sewage, sludge or other combustible organic material at a high rate and with less cost from the standpoint of equipment and maintenance.

These and other objects and advantages of this invention will hereinafter appear and for purposes of illustration, but not of limitation, an embodiment of the invention is shown in the accompanying drawing, in which.

Figure 1:
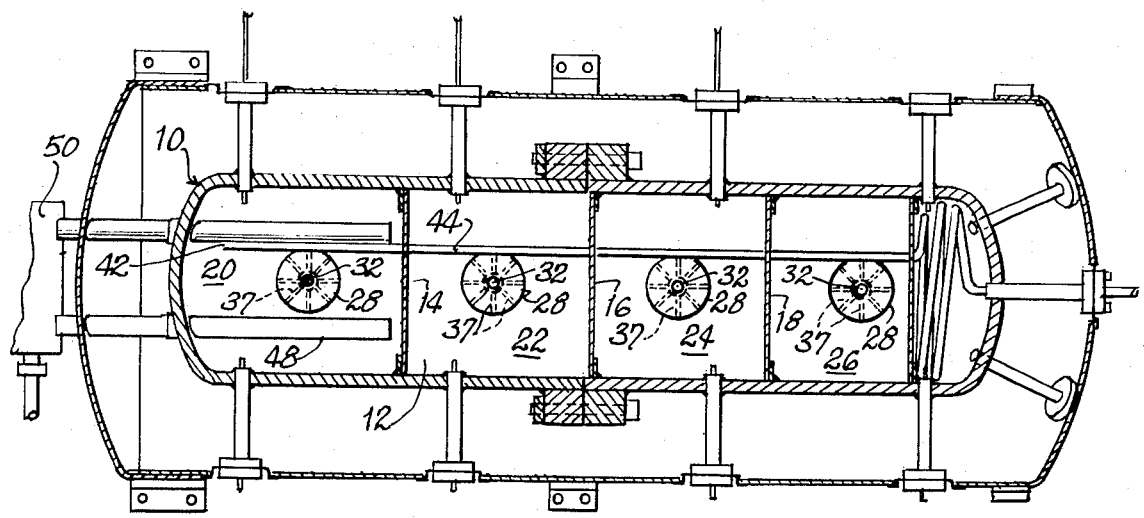
FIG. 1 is a top plan view, partially in section, of a reactor employed in the practice of this invention.

It has been found that combustion of organic matter by wet oxidation is accompanied with the generation of free radicals. The generated free radicals are able to catalyze the reaction for oxidation, at the reactive sites, under conditions of temperature and pressure which are more favorable than the conditions required for the oxidative combustion of organic matter in the absence of such free radicals. Unfortunately, such generated free radicals have a very short life, measurable in a small fraction of a second, whereby it becomes necessary for utilization of the free radicals to provide reactive sites for the oxidation reaction and rapidly to transport free radicals upon generation to such sites, thereby to provide a type of chain reaction under favorable process conditions.

Effective utilization of free radicals in the described wet oxidation process is achieved, in accordance with the practice of this invention, by the introduction of oxygen containing gas into an area of high agitation of the liquid whereby the oxygen containing gas is reduced to finely divided increments which are immediately and uniformly distributed throughout the body of liquid for intimate association with combustible organic material to provide active sites for oxidation. At the same time, the generated free radicals are immediately transported to such active oxidation sites. In this manner, the ease of oxidation is increased whereby the rate of oxidation of the combustible organic matter can be increased when operating under temperature or temperature and pressure conditions heretofore employed or, more desirably, the wet oxidation process can be carried out at lower temperature, or lower temperature and pressure, without reduction in the rate of oxidation which has been accepted as commercial. Still further, the greater ease at which oxidative combustion takes place, in the presence of free radicals, permits wet oxidation to be carried out to a higher percent reduction of COD in less time, thereby to produce a cleaner effluent which can be safely returned to natural bodies of water, or otherwise used in irrigation or the like without fear of contamination, odor or pollution.

Under these conditions a rate and amount of oxidative combustion of organic matter dissolved or dispersed in the aqueous medium is better than or comparable to that obtained at temperatures of 550°F and pressures of 1,500–2,000 psig can be obtained at temperatures below 480°F but above 400°F, and preferably within the range of 420°–465°F and at pressures less than 600 psig and preferably within the range of 500–550 psig.

The unexpectedly high reaction rate and high percentage reduction in COD at such relatively lower temperatures and pressures is difficult to explain other than by reference to acceleration by free radicals generated on combustion and utilized at sites made more receptive for consumption by oxidation. Preparation of the sites for accelerated reaction is believed to be achieved under the described operating conditions by providing what might be defined as rubbing or abrasive contact between the combustible organic matter and the oxygen over a maximum area, by reason of the high state of movement during agitation and the finely divided state of the oxygen containing gas.

The benefits capable of being derived from this unique approach towards wet oxidation for disposal of sewage, sludge or other organic waste, can be demonstrated by the following example which has been carried out in a reaction of the type hereinafter to be described.

Briefly, the reactor comprises a type of autoclave having an inlet at the bottom for the introduction of air and an outlet spaced from the top to provide a volume above the outlet which corresponds to about 20% of the total volume of the reactor. The reactor is provided with a pair of vertically spaced high speed stirrers mounted to rotate about a vertical axis in the center of the reactor, with the stirrer blades projecting downwardly from a base support in the form of a disc plate. The interior surfaces of the reactor, which are contacted by the liquor, are formed of a high nickel steel, titanium, or other corrosion resistant metal and the liquor is introduced in amount to fill the reactor to the level of the outlet, under the conditions of steady operation.

EXAMPLE 1

For purposes of comparison of the rate of oxidation and percent reduction in COD between a non-agitated system, representative of prior practice, and a system representative of the practice of this invention, wherein the oxygen containing gas is introduced at the point of greatest turbulence for maximizing the chain reaction with generated free radicals, use is made of an unacidified sewage sludge having a chemical oxygen demand of 27,000 mg/l O. The sewage sludge was maintained in the reactor at a temperature of about 460°F and at a pressure of about 550 psi max. Air was introduced through an inlet at the bottom of the reactor, immediately below the lowermost stirrer at a flow rate of ≈1 scfm (standard cubic feet per minute). In the non-stirred run, the stirrers were operated for 30 seconds after 20 minutes to insure homogeneity just prior to sampling. Otherwise, the only agitation was generated by the air flow through the liquor and by the evolution of steam and carbon dioxide as a combustion product, as well as the liberation of heat generated by the exothermic combustion process.

In the run representative of the practice of this invention, the stirrers were operated at a rate of 800–900 rpm.

Figure 3:
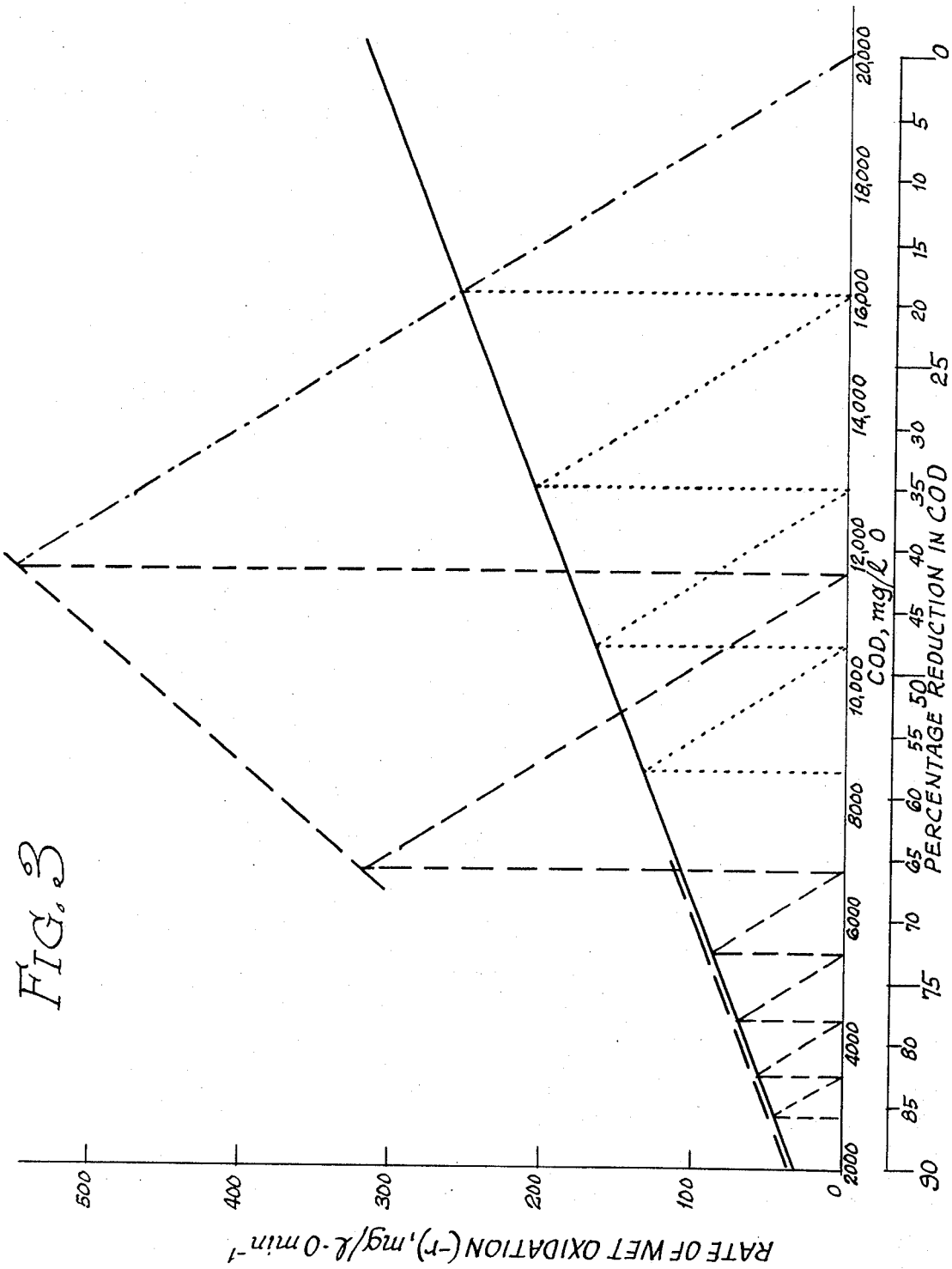
FIG. 3 is a graph embodying curves representing the oxidation rate under described conditions.

Samples were taken after 20 minutes and analyzed for the amount of oxygen combustible organic material in solution for determining the rate of wet oxidation per increment of time and the percent reduction in COD. The results are plotted to provide the curves drawn in FIG. 3 in which the solid lines are drawn from the values of the non-stirred run, while the broken line curve is drawn from the result of the run in which utilization of generated free radicals is maximized.

It will be seen by extrapolation of the curves that, in the case of the former, destruction of organic matter occurs at the start at a rate which is in the vicinity of 300 mg/l O per minute compared to a rate of 1,100 mg/l O per minute for the latter, and that the rate of destruction, after 65% reduction in COD, is reduced to about 100 mg/l O per minute for the former compared to better than 300 mg/l O per minute for the latter.

During the first 20 minutes, the COD of the continuously stirred sample was reuced to 42% at an average rate of about 550 mg/l, while it took 50 minutes, at an average rate of about 220 mg/l to obtain a corresponding reduction in COD in the unstirred run.

It will be noted further that, in the non-stirred run, there is no break in the rate curve as between the rate at the beginning of the oxidation reaction (macro molecules) as compared with the rate at the latter stages of oxidation wherein a higher percentage of lower molecule wet organic matter is present in the liquor.

On the other hand, in the run carried out under conditions for a high rate of oxidation, the rate curve changes of necessity from a high rate at the start to a lower rate after 65–70% reduction in COD, in which the latter rate compares to that for the non-stirred run.

Thus, at such low levels of temperature and pressure, the time factor to achieve a desirable percentage reduction in COD for the non-stirred run makes the process impractical whereas the run representative of the practice of this invention is equal to, if not more acceptable than, current high temperature – high pressure operation, at least from the standpoint of rate of combustion and percentage reduction in COD.

The foregoing is a theoretical explanation of the reaction that is believed to take place under the conditions described in our aforementioned copending application and is fully supported thereby.

Figure 2:
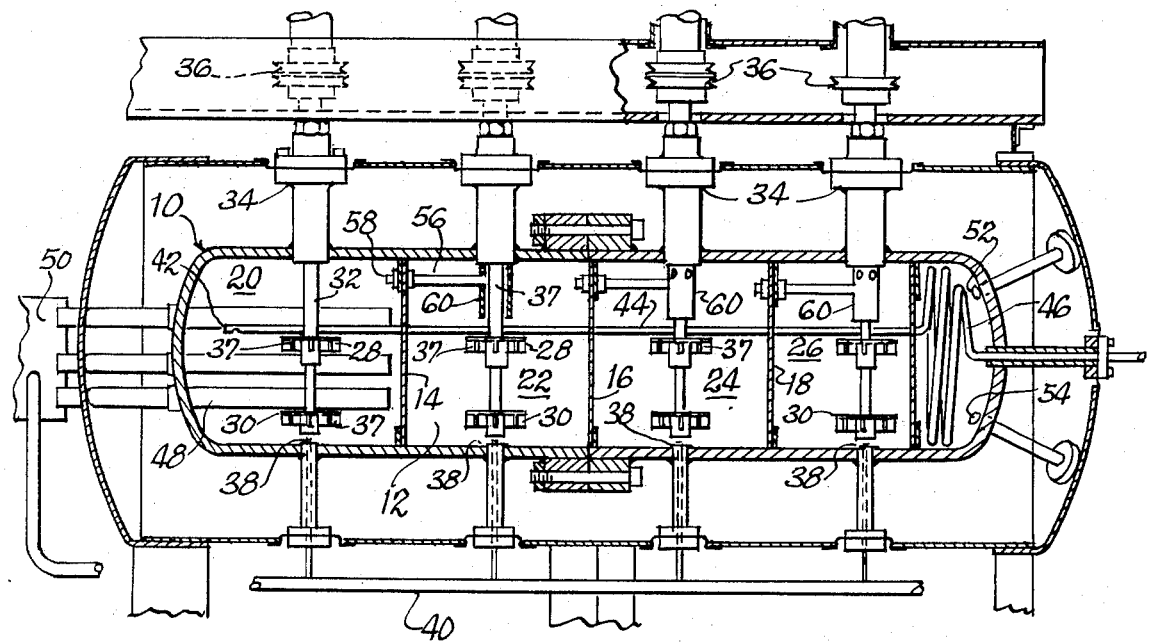
FIG. 2 is a side elevational view of the reactor shown in FIG. 1.

The improvement in reactor design for wet oxidation reduction of combustible organic matter in sewage sludge or waste is illustrated, in FIGS. 1 and 2, as a horizontally disposed elongate member 10 of cylindrical shape. The interior 12 of the reaction cylinder is subdivided by vertical walls 14, 16 and 18, into a series of adjacent compartments 20, 22, 24, and 26, each of which is in the form of a cylindrical section. It will be understood that the cylindrical reactor may be of various dimensions depending somewhat upon the desired capacity of the unit and that the compartments can vary in their dimension or volumetric capacity, preferably with the initial compartments of greater capacity than the others.

Each compartment is provided with its own agitator, preferably in the form of a stirrer comprising a pair of disc members 28 and 30, secured in vertically spaced apart relation on a shaft 32 centrally disposed within each compartment for rotational movement about a vertical axis with the portion of the shaft mounted in bearings 34 for extension beyond the reaction cyclinder 10 in sealing relation, with the through-extending portion being provided with means, such as sheaves 36, for driving the shaft in rotational movement, as by a motor driven belt, or by means of an electrical motor drive for each shaft. Each disc 28 and 30 is provided with radially extending vanes 37 which project downwardly from the bottom side of the disc members. When use is made of the described pair of vertically spaced disc members, it is desirable to locate the lower disc at a level of about one-third of the height of the compartment while the other disc is at a level of about two-thirds the height; however, only one or more than two disc stirrers can be employed but with the lowermost disc stirrer located in spaced relation with the bottom of the compartment and with the uppermost disc stirrer located in spaced relation from the top of the compartment, with the stirrers preferably confined to a space within one-quarter from the top and below the liquid level in the compartment.

Air, oxygen or other oxygen containing gas is introduced into the compartments in which oxidative reaction is desired to take place through an inlet in the form of one or more nozzles 38 for introduction of the oxygen containing gas or air directly into the zone of greatest agitation created by the lowermost of the stirrers. In the illustrated modification, the nozzles 38 extend upwardly from the bottom side of the compartment to immediately below the vane section 36 of the lowermost stirrer for projection of the stream of air or oxygen containing gas upwardly in the direction toward the bottom side of the stirrer for immediate exposure of the introduced air or gas to the torsional forces generated by the stirrer rotating at high speed thereby to break down the air into fine increments for immediate distribution with the liquor in turbulent flow. The nozzles 38 can be aligned with the center of the stirrer or offset from the center, but preferably within the span of the stirrer so as to be introduced into the vortex generated thereby. Air or other oxygen containing gas is applied to the nozzle from a header 40 communicating with a compressor or accumulator for introducing the air or gas under a high pressure equal to or preferably greater than the pressure conditions existing within the reaction compartment.

The first compartment 20 is provided with an inlet 42 at the end of a tubular member 44 which communicates with heat exchange coils 46 in the last compartment 26 for preheating the liquid before introduction into the reactor by heat exchange with the hot liquid and gases to be exhausted from the last compartment. The first compartment is also provided with a series of electric heaters or heat exchange coils 48 through which heat exchange liquid is circulated from a header 50 for purposes of introducing heat sufficient to initiate the reaction and for removing heat generated by the exothermic reaction thereby to maintain temperature control of the materials within the reaction chamber. The last compartment, referred to as the disengaging zone, is provided with one outlet 52 in communication with the vapor space in the upper portion of the compartment for the discharge of vapors and another outlet 54 in communication with the liquid space in the lower portion of the compartment for the removal of liquid effluent from the compartment.

The compartments are interconnected for fluid flow from one compartment to the other as by means of a hollow tubular member 56 which extends crosswise from an outlet 58 in the upper portion of the leading compartment to a vertically disposed downpipe 60 in the following compartment. The inlet 58 in each of the leading compartments is located in the upper portion of the compartment thereby to subdivide the compartments in a liquid space which rises to the level of the inlet and a vapor space above the inlet. The inlet should be located at a level at least 10% but not more than 40% of the distance below the top of the compartment and preferably at a level within the range of 15–25% below the top to provide a vapor space corresponding to 10–40% and preferably 15–25% of the total volume of the compartment.

The vertically disposed hollow downpipe 60 is dimensioned to have a length whereby the upper end portion is provided with openings that communicate with the vapor space of the compartment while the open bottom end extends to below the liquid level and is submerged within the liquid in the compartment, during normal operation. Thus the mixture of liquid, gas and vapor which flows through the tubular connector 56 from a leading compartment to the adjacent compartment separates during flow through such tubular member to enable the gases and vapor to flow upwardly through the downpipe into the vapor space of the adjacent compartment while the liquid flows downwardly through the downpipe into the body of liquid within the compartment.

In the construction of the illustrated modification, the described connector is in the form of a hollow T-section with the downpipe preferably arranged concentrically about the stirrer shaft 32 and with the horizontally disposed tubular connecting portion 56 extending through the wall separating compartments into communication with an intermediate portion of the downpipe. The tubular connectors between compartments are arranged at slightly lower levels from one compartment to the next to enhance flow in the direction from the first compartment to the next, etc. It is sufficient if the differential in level is but a fraction of an inch or more to enable gravitational force to enter into the control for directional flow of fluid between compartments.

Oxidation is relatively rapid until about two-thirds of the original combustible organic material has been oxidized, then continues at approximately one-third the rate for the remainder. Thus, most of the oxidation occurs in the initial compartment or compartments.

It has also been found that oxidation reaction, qualitatively speaking, proceeds stepwise through a series of reaction intermediates. It is believed that the organic materials are hydrolyzed and/or oxidized from their initial complex structure to simpler, lower molecular weight oxidation reaction products, such as the lower fatty acids, e.g., acetic acid. This reaction occurs relatively rapidly. Oxidation of the intermediates to the end product, namely carbon dioxide and water, then proceeds at a much slower rate.

These latter compounds are volatile and tend to pass into the vapor phase along with steam and uncondensable gases such as nitrogen, carbon dioxide, and unused oxygen. These gases are discharged from the reactor 10 through the outlet 52 and ultimate release to the atmosphere. Before release into the atmosphere, the residual heat contained in such gases and vapors may be recovered by the passage thereof in heat exchange relationship with the feed to the reactor or energy may be recovered for the generation of power.

The interior walls of the reactor and the elements therein, which are exposed to the liquid and oxygen under the high temperature and pressure conditions, are desirably entirely made of titanium. However, use can be made of other metals and steel capable of resisting corrosive attack under the described operating conditions, such as of type 316 stainless steel, lead lined walls protected by acidproof brick, walls lined with carbon or graphite brick bonded with acidproof cement, such as marketed by National Carbon under the trade name "C-6." From the standpoint of cost and ease of construction, the latter materials are preferred for constructions of large capacity.

The reaction temperature within each of the compartments may be maintained within the range of 400°–480°F. Within this range, the temperature in each compartment can be maintained the same or varied. The temperature can be increased from the first to the last compartment to compensate for change in reaction rate but in the preferred practice the temperature in each compartment decreases from the first to the last. Usually it is desirable to maintain a total pressure of between 50 and 200 psig above the vapor pressure of water at the highest temperature in the reactor since this provides for sufficiently high oxygen partial pressures for solubility of sufficient oxygen in the liquid phase without unduly increasing the cost and complexity of equipment and operation. Where use is made of pure oxygen, the total pressure to afford the desired solubility of oxygen will ordinarily be less than that of systems wherein the oxygen is supplied by air.

The rate at which the air or other oxygen containing gas is admitted into the reaction zone is determined somewhat by the quality (COD) of the organic waste material being treated, the quantity of such material in volumes per unit time, and the desired degree of oxidation. Ordinarily, the minimum input of oxidizing gas corresponds to the stoichiometric amount required for oxidation of the combustible organic material, that is the amount of oxygen needed to reduce the COD of the feed to a predetermined level. It has been found, however, that even with efficient utilization of oxygen, in accordance with the practice of this invention, the oxygen input should be within the range of 0.6 to about 1.5 times the theoretical amount required to reduce the COD to zero.

The reaction can be carried out at normal pH of the aqueous solution or dispersion of the sludge, sewage or the like, but combustion of the organic matter can be accelerated, under the described conditions, when the reaction is carried out under acidic conditions, preferably with the liquor at a pH within the range of 1.5 to 7.0. For this purpose, use can be made of organic or inorganic acids but it is preferred to make use of sulphuric acid for pH adjustment.

The raw sewage or sludge can be introduced directly into the reactor or it can be subjected to one or more pretreatments including primary sedimentation or screening for physical separation to remove particles beyond a predetermined size whereby some 30–60% of the BOD is removed. The solid materials screened from the sewage can be dried and burned.

Pretreatment may also include a sedimentation step for separation into a solid effluent which represents the sewage sludge fed to the reactors and a liquid effluent of suspended solids and solution which can be processed through a biological treatment, such as an aerobic oxidation or fermentation to produce an activated sludge. From the biological treatment, the effluent can be processed by sedimentation to yield an activated sewage sludge which may be returned in part to the primary sedimentation and/or in part to the reactor for wet oxidation.

EXAMPLE 2

This example illustrates the wet oxidation of a simulated shipboard waste, using a multiple-stage compartmented reactor of the type described. The waste has not been subjected to any pretreatment, such as aerobic microbial digestion.

The reactor comprised a horizontally disposed cylindrical vessel having an internal diameter of 10 inches and an internal length of 42 inches, the walls of which were lined with carbon. Three titanium baffles divide the vessel into four equally sized compartments. The tubular connectors between compartments were at a level to provide a vapor space of about 15% of the total volume of each compartment. The feed material was introduced into the first compartment through an inlet near the top of the vessel and was discharged from the last compartment through an outlet slightly above the center line. The turbine type agitator, formed of welded titanium, comprised disc members having a diameter of 3 inches and eight blades of three-eighths by three-fourths inch radially arranged on the underside of each disc in equally circumferentially spaced apart relation, with the lower disc located approximately one-third from the bottom of the reactor while the upper disc was about two-thirds of the distance from the bottom.

The reactor was fed by a blow-case pump system which injected 1 liter of aqueous waste into the first compartment during a 20-second injection period of an approximately 2-minute pumping cycle, the liquid being passed through a heat exchanger to provide proper pretreatment temperature.

Sulphuric acid was added in the amount of 6 grams per liter to the aqueous waste before injection into the reactor to adjust the pH to the acid side.

The aqueous waste was prepared by macerating the daily waste of one person, diluting it to 35 gallons, the waste being made up of the following:

Composition of Influent

Table Scraps
  Shells from two eggs
  Grease from frying two eggs
  Coffee grounds from percolating six cups
  Trimmings from one steak
  Remains from one salad
  Remains from one serving of beef and noodles
  Peels from one orange
  One-third slice of bread
Toiletries
  Shaving cream from one shave
  Toothpaste from one brushing
Body Waste
  Feces from one individual, collected over a 24-hour period (Est. 100–150 gm.)
  Urine, 1 quart
Municipal Water
  Thirty-five gallons.

The samples for analysis were taken at hourly intervals after steady operations have been achieved (after 2 hours of operation).

The material in the first compartment was maintained at a temperature of 470°–480°F; second compartment 460°–465°F; third compartment 430°–450°F, and fourth compartment 420°–440°F.

The reactor pressure was maintained at 600 psi max. and a steam pressure of 550 psi max. Air was introduced at the rate of 4.8 cubic feet per minute in amounts equally distributed between compartments and the aqueous waste was introduced at a rate of 0.433 liters per minute. The average residence time per compartment was about 15 minutes and the agitators rotated at a speed of 1,300 rpm.

Analysis of the streams for chemical oxygen demand (COD) was made in accordance with the procedure of "Standard Methods for the Examination of Water and Wastewaters", 13th Edition.

The following are the results that were obtained:

Results of Chemical Analysis: Test 1

| Sampling Time in hours | Sample Station | COD, mg/l O | | Percent Reduction in COD |
|---|---|---|---|---|
| 1 | Influent | 1975 | | — |
|   | Compartment 1 | 945 | | 52.2 |
|   | Compartment 2 | 626 | | 68.3 |
|   | Compartment 3 | 586 | | 70.3 |
|   | Compartment 4 | 529 | | 73.2 |
| 2 | Influent | 1715 | | — |
|   | Compartment 1 | 850 | | 50.4 |
|   | Compartment 2 | 559 | | 67.4 |
|   | Compartment 3 | 503 | | 70.4 |
|   | Compartment 4 | 407 | | 76.3 |
| 2:45 | Influent | 1809 | | — |
|   | Compartment 1 | 692, | 670 | 61.7 |
|   | Compartment 2 | 551 | | 69.5 |
|   | Compartment 3 | 483 | | 73.3 |
|   | Compartment 4 | 393 | | 78.3 |

It will be seen from the foregoing that 73–78% reduction in COD was obtained within the one hour residence time within the reactor, with the maximum percent reduction being obtained in the first compartment as compared to the remaining compartments.

EXAMPLE 3

In this example, the apparatus of Example 2 was used to demonstrate the effectiveness of the process in treatment of primary sewage sludge.

The process was carried out under the following conditions:

| | |
|---|---|
| Reactor Temperature | |
| Compartment 1 | 470–480°F |
| Compartment 2 | 460–470 |
| Compartment 3 | 450–460 |
| Compartment 4 | 430–450 |
| Reactor Pressure | |
| Total | 600 psi max. |
| Steam | 550 psi max. |
| Air Flow | 4 cfm |
| Pct. supplied to Compartment 1: | 33 |
| Pct. supplied to Compartment 2: | 27 |
| Pct. supplied to Compartment 3: | 20 |
| Pct. supplied to Compartment 4: | 20 |
| Speed of Agitators | 800–900 rpm |
| Residence Time | 64 min. total |

The primary sewage sludge was acidified with 6 g/l $H_2SO_4$.

An analysis of the compositions in the various compartments revealed the following:

| | C.O.D. | %C.O.D. Reduction |
|---|---|---|
| Inlet | 40,900 mg/l O | — |
| Compartment 1 | 17,300 | 57.3 |
| Compartment 2 | 9,000 | 78 |
| Compartment 3 | 7,400 | 82 |
| Compartment 4 | 6,400 | 84.4 |
| Effluent | 6,500 | 84.4 |

It will be apparent from the foregoing that we have provided a process for wet oxidation of a sewage sludge or other organic waste at a high rate of oxidation and at a sufficiently low temperature to enable commercial practice with readily available equipment and materials to produce an effluent which is clean and can be reintroduced into the waterways without undesirable contamination or pollution and in which utilization can be made of the energy made available during the oxidation reaction for operation of the process or for other utilizations.

It will be understood that changes may be made in the details of construction, arrangement and operation without departing from the spirit of the invention, especially as defined in the following claims.

We claim:

1. In a process for oxidation of combustible organic matter in an aqueous system in the form of solution or dispersion by exposure to an oxygen containing gas under elevated pressure and temperature conditions, for a time sufficient to effect substantial reduction in chemical oxygen demand, the improvement which comprises vigorously agitating the aqueous system and simultaneously introducing the oxygen containing gas into the area adjacent high agitation to effect immediate breakdown of the oxygen containing gas into fine increments which are rapidly distributed throughout the aqueous system and to effect rapid transport of free radicals generated by the oxidation reaction to other sites capable of oxidation of combustible organic matter before expiration of the life of the free radicals, thereby to catalyze the oxidation reaction to achieve a high rate of oxidation of combustible organic matter in the aqueous medium.

2. The process as claimed in claim 1 in which the oxygen containing gas is introduced into the aqueous system into the area adjacent the source of agitation.

3. The process as claimed in claim 1 in which agitation is effected by a turbine type stirrer rotatable about a vertical axis with the agitator blades extending in the downward direction and in which the oxygen containing gas is introduced into the aqueous medium in the area immediately below the turbine blades.

4. A process as claimed in claim 1 in which the oxidation reaction is carried out with the materials at a temperature within the range of 400°–480°F.

5. A process as claimed in claim 1 in which the oxidation reaction is carried out with the materials at a temperature within the range of 420°–460°F.

6. A process as claimed in claim 4 in which the reaction is carried out with the materials under a pressure of 50–200 psi above autogenous pressure.

7. In a reactor for the wet oxidation of combustible organic matter in an aqueous dispersion or solution, an elongate horizontally disposed continuous chamber having an inlet at one end portion and an outlet at the other end portion, vertically disposed walls subdividing the chamber into a plurality of compartments in side by side arrangement with an inlet in the compartment at one end for the introduction of the aqueous solution and dispersion of organic matter and an outlet in the compartment at the other end for the removal of aqueous liquor which has been subjected to wet oxidation during travel through the compartments, an agitator in the compartments for agitation of the aqueous solution or dispersion within the compartment, a source of oxygen containing gas, and means for continuous introduction of the oxygen containing gas into compartments in the vicinity of high agitation of the liquid within the compartment for immediate dispersion of the oxygen containing gas as fine increments in the liquid and for rapid transport of free radicals generated upon combustion to other combustion sites before expiration of the free radicals to catalyze the oxidation reaction, and a passage through the separating walls for communicating the adjacent compartments for flow of fluid from one compartment to the other through the chamber.

* * * * *